United States Patent [19]

Moorhead

[11] Patent Number: 4,981,587
[45] Date of Patent: Jan. 1, 1991

[54] SIEVE WITH ADJUSTABLE THROAT MECHANISM DISCHARGE

[75] Inventor: Robert G. Moorhead, Blairsville, Pa.

[73] Assignee: Electric Power Research Institute, Inc., Palo Alto, Calif.

[21] Appl. No.: 246,314

[22] Filed: Sep. 13, 1988

[51] Int. Cl.⁵ .............................................. B01D 29/90
[52] U.S. Cl. .................................... 210/402; 210/405; 210/421; 210/456; 209/284; 209/488; 209/499; 162/343; 162/347
[58] Field of Search ............... 210/402, 405, 418, 420, 210/421, 456; 209/240, 243, 250, 254, 284, 488, 489, 497, 498, 499; 162/336, 343, 344, 346

[56] References Cited

U.S. PATENT DOCUMENTS 3,888,729  6/1975  Parker et al. ...................... 162/343
3,902,961  9/1975  Roerig et al. ....................... 162/344
3,972,771  8/1976  Notbohm .............................. 162/343
4,128,455 12/1978  Justus .................................. 162/343
4,141,789  2/1979  Justus .................................. 162/347
4,280,870  7/1981  Bubik et al. ........................ 162/347
4,710,296 12/1987  Connolly ............................. 210/420

Primary Examiner—Richard V. Fisher
Assistant Examiner—Wanda L. Millard
Attorney, Agent, or Firm—Leonard Bloom

[57] ABSTRACT

A sieve bend has been described incorporating a headbox 40, throat mechanism 46, nip flap 90 and sieve surface area 52 supported by frame 96 which may have portions thereof rotated or positioned behind headbox 40 temporarily until its use is desired. The invention overcomes the problem of requiring frequent end for end reversal of the sieve surface area and of debris jamming the throat mechanism. Further, the invention permits in process variation of the sieve surface area 52 in response to downstream conditions.

2 Claims, 2 Drawing Sheets

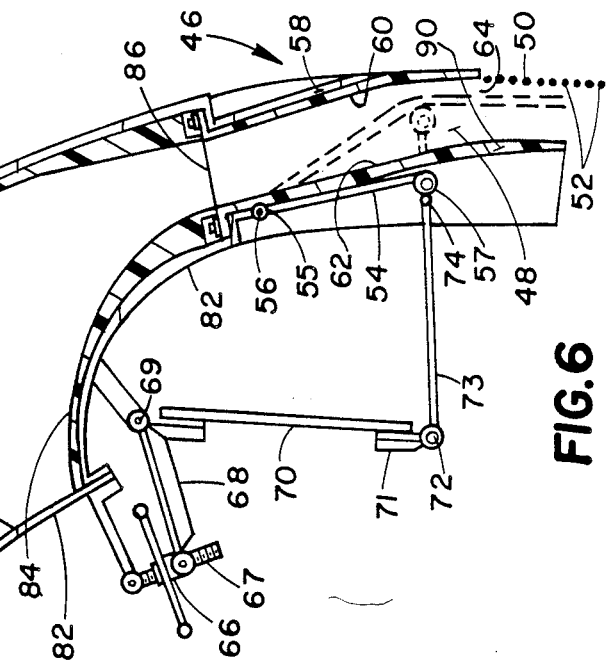
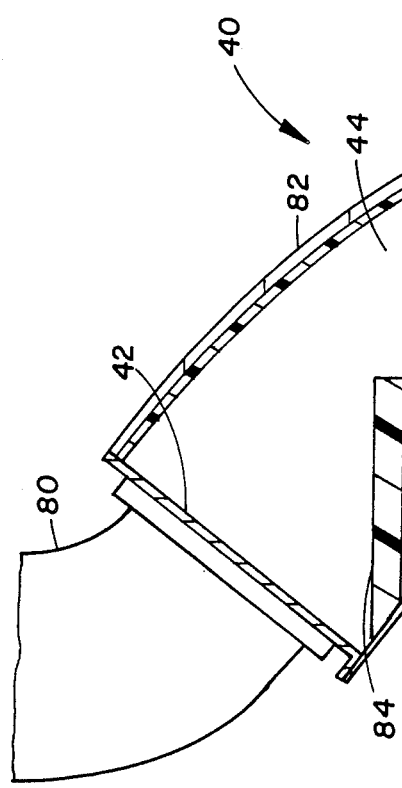
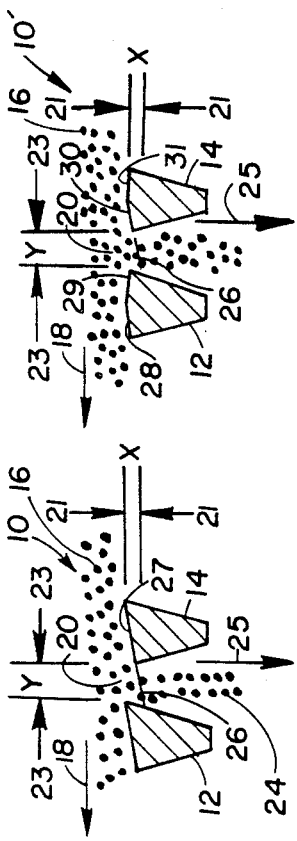
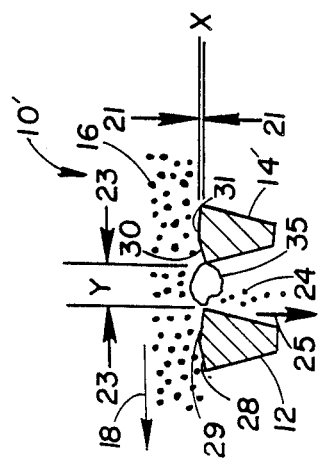
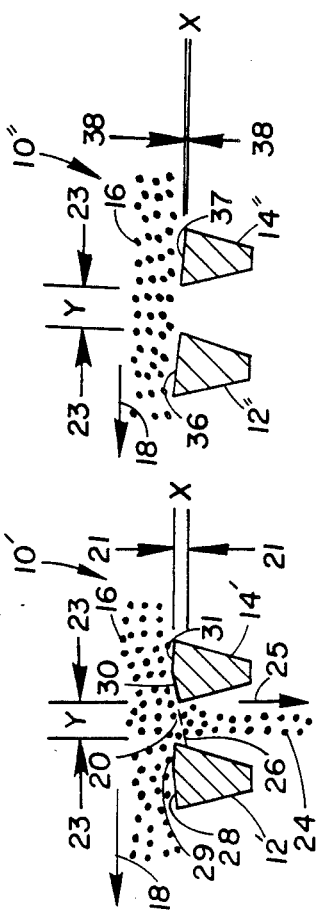

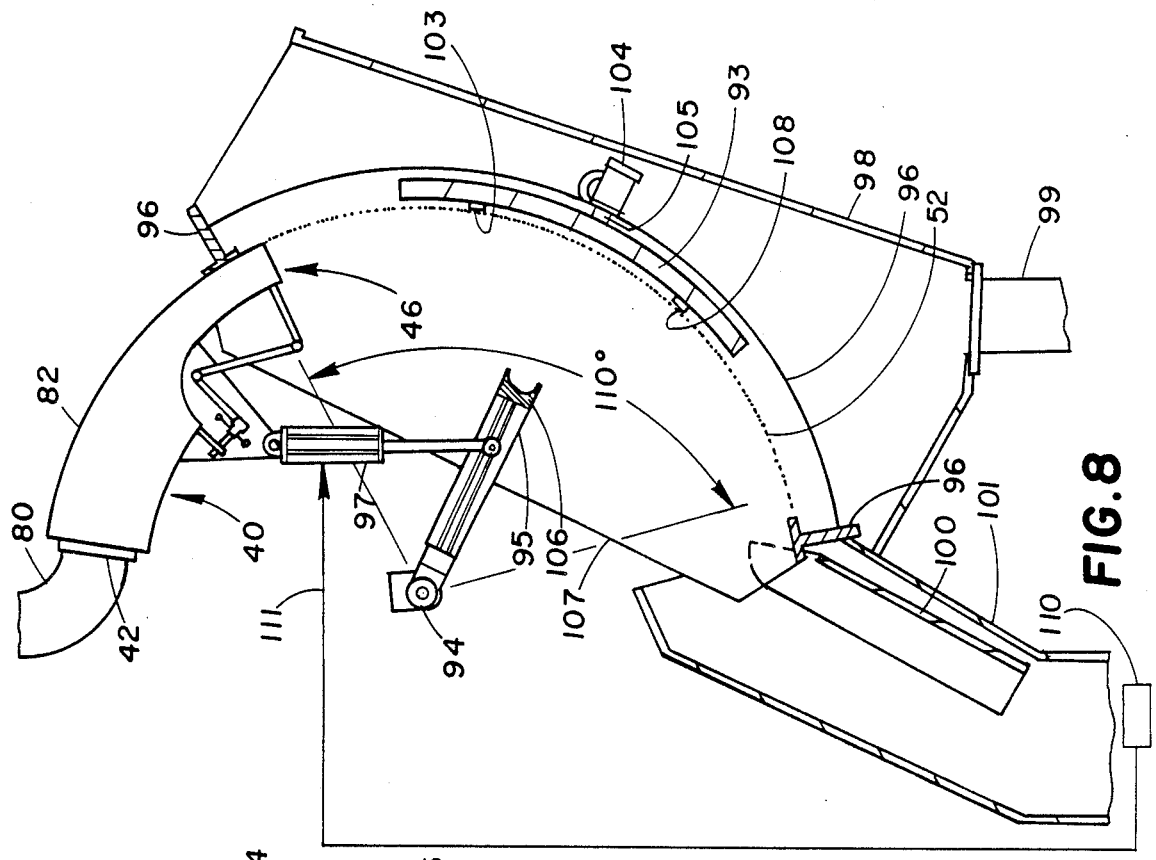
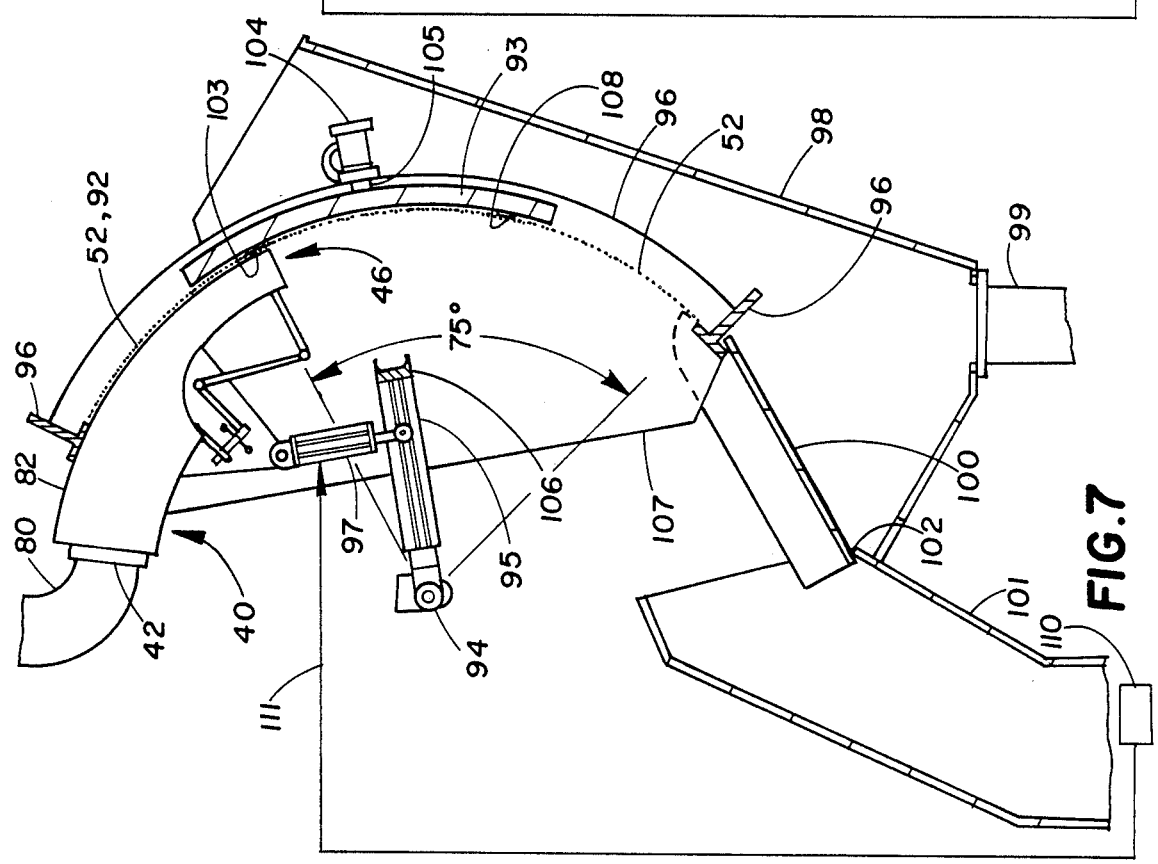

SIEVE WITH ADJUSTABLE THROAT MECHANISM DISCHARGE

BACKGROUND OF THE INVENTION

1. Field of the Invention

This invention relates to a sizing device useful in coal washing and mineral extraction and more particularly, to a sieve bend for separating particles less than a predetermined dimension from a slurry.

2. Description of the Prior Art

In commercial coal-cleaning plants, sieve bends are used to remove either −0.15 mm pyrite (containing sulfur) or clay (containing high ash), or both. Pyrite and clay contaminant clean-coal, potentially causing problems in a utility boiler.

Although fine-aperture sieves have high capacities and sizing efficiencies when first installed, their performance deteriorates over time because coarse particles, 6.3 mm (¼in) or greater in size, errantly enter the fine-coal circuit feeding the sieves and obstruct the feed throat to the sieve. Variations in flow of slurry cause the headbox feeding the sieve to empty and reduce the velocity of the slurry feeding over the sieve. The sieve bend capacity is dependent upon three variables: the velocity of the slurry flowing over the sieve, the thickness of the layer of slurry that is diverted through the slotted openings on the sieve, and the number of wires the slurry contacts while traveling over the sieve. Further, the profile of each wire dulls during abrasive wear and use, reducing the actual thickness of the layer of slurry each wire diverts through the slot. Further, the slurry misses a portion of the sieve's surface because of misalignment between the sieve and the headbox feeding the sieve.

In U.S. Pat. No. 2,748,941 granted June 5, 1956 to F. J. Fontein et al., an apparatus whose screening deck can be reversed in a simple manner is shown. The screen separates liquid suspended particles.

In U.S. Pat. No. 2,814,388 granted on November 26, 1957 to F. J. Fontein et al., a screening device is shown in which the material to be screened, consisting of a mixture of solid particles of different grain size suspended in the liquid, is fed tangentially as a thin layer to the concave side of a screen deck which consists of a cylindrically bent screening surface.

In U.S. Pat. No. 2,916,142 granted on December 8, 1959 to F. J. Fontein, shows in FIG. 8, a plate 124 and outer wall 125 which operates to deliver the mixture along a tangential path to a curved screening deck 126 composed of bars 127.

In U.S. Pat. No. 3,007,574 granted on November 7, 1961 to J. de. Koning, in FIG. 1 a slot-shaped aperture 3 is shown mounted over sieve bend 4 including a screening deck 5 comprising horizontal bars 6. Shaft 20 and shaft 17 are provided to facilitate reversing screening deck 5 end for end.

In U.S. Pat. No. 3,353,674 granted November 21, 1967 to J. N. J. Leeman, a sieve bend 4 is shown having a spout 2 communicating with a throat 3 wherein the throat 3 is defined by a sloping wall 5 tangentially leading into the upper end of the curved screening deck 6 of the sieve bend 4 and a movable wall comprising a resilient rubber plate 7 in such a way that a wall 5 and plate 7 converge downwardly towards the sieve bend 4. Rubber plate 7 may be hinged and is deflectable, to prevent obstruction of the feeding throat by coarse particles contained in the material supplied.

In U.S. Pat. No. 3,446,349 granted on May 27, 1969 to W. Benzon, a sieve bend is described with means for depositing slurry onto the sieve bend across the entire width thereof under a static head at a velocity sufficient to prevent build-up of solid particles at the discharge end of the sieve bend. A means for intermittently rapping the sieve bend is further described.

In U.S. Pat. No. 4,113,626 granted September 12, 1978 to T. E. Detcher, a screen assembly having a semiparabolic concave vertically extending surface defined by horizontally extending wedge shaped bars fixed in spaced parallel relation to approximately curved support means is described.

SUMMARY OF THE INVENTION

An apparatus and method is described for separating fine particles from a slurry comprising a headbox having a first opening for receiving the slurry into a region for holding the slurry and a second opening including a throat mechanism for discharging the slurry from the region over a plurality of spaced apart wires positioned transverse to the second opening, the wires positioned successively down stream to form a sieve surface area for the slurry to flow over, the throat mechanism including a hinged plate on one side of the throat mechanism and mechanical linkages or actuators connected to the plate for varying the width of the second opening as a function of a predetermined variable, for example, the static head pressure of the slurry in the headbox.

The invention further provides a nip flap of flexible material extending downsteam from the opening of the throat mechanism with a portion of the nip flap opposite a plurality wires forming a portion of the upstream sieve surface area.

The invention further provides positioning a portion of the sieve surface area behind the throat mechanism by means of a frame for moving or rotating the sieve surface and parts of the portion behind the throat mechanism down stream of said throat mechanism to permit the slurry to flow over the additional sieve surface.

It is an object of the invention to provide a throat mechanism with means for clearing the throat mechanism of debris, if any debris builds up in the throat area.

It is a further object of the invention to insure the slurry contacts the sieve surface immediately upon leaving the throat mechanism.

It is a further object of the invention to provide a variable exposure sieve bend wherein additional sieve area may be exposed to the slurry either to extend the time before requiring the sieve to be turned end for end or to respond to operating parameters of down stream equipment receiving either the overflow or underflow of the sieve.

BRIEF DESCRIPTION OF THE DRAWINGS

FIG. 1 shows the initial condition of wires as slurry flows over the wires.

FIG. 2 shows the subsequent condition of wires worn down by the flow of slurry.

FIG. 3 shows worn wires with a near size particle in the slot opening with slurry flowing over the wires at low velocity.

FIG. 4 shows worn wires with slurry flowing over the wires at high velocity.

FIG. 5 shows fully worn wires with flat upper surfaces of the wires.

FIG. 6 shows a cross section view of one embodiment of the invention including headbox 40.

FIG. 7 shows a cross section view of an alternate embodiment of the invention including headbox 40 and frame 96.

FIG. 8 shows the embodiment of FIG. 7 with the sieve surface enlarged with respect to the slurry (not shown) discharged from the headbox.

DESCRIPTION OF THE PREFERRED EMBODIMENTS

Referring to FIG. 1, a sieve bend 10 comprising wires 12 and 14 is shown. A typical sieve has hundreds of these wires. Sieve bend 10 is capable of sizing fine particles from slurry 16 which flows in the direction shown by arrow 18 across wires 12 and 14. Particles in slurry 16 do not blind the sieve opening 20 by using a strategy that deters near-size particles from reaching slot opening 20 between wires 12 and 14. Dimension X shown by arrows 21 represent the thickness of slurry 16 that is sliced off the bottom of the flowing layer of slurry 16 by the leading edge of wire 12. Dimension Y shown by arrows 23 represent the width of slot opening 20 between wires 12 and 14. Any particle contained in slurry 16 whose center mass strikes below the diverting edge of wire 12 will be directed through slot opening 20. Comparison of the dimension X with the dimension Y, shows that Y will always be slightly larger than the particle diverted through slot opening 20 due to the dimension of X. This physical condition is the advantage of a sieve bend over other sizing devices that attempt to use the screen opening to physically prohibit larger particles from gaining entrance through the screen. The portion of slurry sliced off from slurry 16 and passing through slot opening 20 is indicated as slurry 24 which flows in the direction shown by arrow 25. Reference line 26 is an extension of upper surface 27 of wire 14 across opening 20.

After a period of time with slurry 16 flowing over wires 12 and 14, wires 12 and 14 wear with the upper surface of wires 12 and 14 becoming convex as shown by wires 12' and 14' in FIG. 2. The upper surface of wire 12' may be shown by surfaces 28 and 29. The upper surface of wire 14' may be shown by surfaces 30 and 31. In FIG. 2 like references correspond to the apparatus shown in FIG. 1. In FIG. 2, if slurry 16 does not have sufficient velocity to develop a low pressure area at the contact of surfaces of 30 and 31 on wire 14', wire' will no longer slice off slurry 24. Slot opening 20, shown in FIG. 3, may be flooded by slurry 16 and creates a condition where near sized particles such as particle 35 can blind slot opening 20 and eventually prohibit water and undersize particles that may be in slurry 16 from passing through slot 20.

However, if sufficient or high slurry velocity of slurry 16 is maintained, the condition shown in FIG. 4 will exist. The velocity of slurry 16 creates a low pressure area at the contact layer between slurry 16 and surfaces 28 and 29 of wire 12' and surfaces 30 and 31 of wire 14' which causes slurry 16 to follow the profile of surfaces 28 and 29 of wire 12' and surfaces 30 and 31 of wire 14'. The surface tension of slurry 16 insures the remaining slurry follows the contact layer. This phenomenon promotes the continual slicing of a layer of slurry 24 from slurry 16 as initially created by sharp or unused wires 12 and 14. In FIGS. 2–5, like references are used for the apparatus of FIG. 1.

Eventually the wear of wires 12' and 14' shown in FIG. 4 creates the condition shown in FIG. 5 where the upper surface of wires 12" and 14" are worn flat having upper surfaces 36 and 37. Since the dimension X shown by arrows 38 is zero or very close to zero, little or no slurry of slurry 16 is sliced off by wires 12" and 14".

Referring now to FIG. 6, a cross section view of headbox 40 is shown. Headbox 40 has a first opening 42 for receiving slurry (not shown) into region 44 which functions to hold the slurry. The slurry is subsequently discharged through a throat mechanism 46 and out second opening 48. A sieve bend 50 is positioned at opening 48 on one side down stream of throat mechanism 46. Sieve bend 50 may include a plurality of spaced apart wires positioned transverse to second opening 48 with the wires positioned successively downstream to form a sieve surface area 52 for slurry to flow over. The throat mechanism 46 includes a plate 54 having an upper edge 55 which may pivot about axis 56 permitting lower edge 57 to move towards and away from plate 58. Plate 58 forms one side of throat mechanism 46 while plate 54 forms the other side of throat mechanism 46. Therefore when plate 54 moves towards or away from plate 58, the width of second opening 48 is varied.

Phantom lines show the position of plate 54 and edge 57 as it is moved closer to plate 58. Material 60 may cover plate 58. Material 62 may cover plate 54.

Referring to FIG. 6, opening 48 may normally operate as shown by the phantom lines and provide an opening 64 which may be determined by adjusting nut 66 on screw 67 which causes arm 68 to pivot about axis 69. Spring 70 moves arm 71 which is coupled through pivot point 72 to arm 73 which is coupled to pivot point 74. Pivot point 74 is attached to edge 57 of plate 54. Spring 70 may bend in a arc when plate 54 moves outward away from plate 58. To insure constant slurry velocity, throat opening 48 is controlled by spring 70 with calibrated tension that permits throat 48 to clear itself of debris by the movement of plate 54 away from plate 58. If any debris builds up in throat 48 or between plates 54 and 58, the static head of slurry in region 44 will increase due to the accumulation of more slurry due to the blocking of opening 48 due to debris. The increased static head of the slurry will increase the pressure on plates 54 and 58. The pressure on plate 54 will be transferred by arm 73 and arm 71 to spring 70 which will deflect increasing the throat opening 48, and permitting the debris to be discharged from throat mechanism 46. After the debris clears itself from throat mechanism 46 and the static head is reduced, plate 54 due to spring 70 returns to its original position to provide second opening 64.

As shown in FIG. 6, duct 80 may supply slurry to opening 42 of headbox 40 which may be, for example, 12% solid and 88% water. Solid particles may include clay, coal and magnetite. Housing 82 of headbox 40 may be constructed of steel with a coating of resistant material 84 thereover, to protect housing 82 from wear. Opening 86 up stream of the throat mechanism may be, for example, 4.76 mm (3/16 in.) to 6.35 mm (¼ in.). The length of the throat opening as well as the remainder of headbox 40 is orthogonal to the page as shown in FIG. 6 and may be in the range from 60.96 cm. (24 in.) to 121.92 cm. (48 in.).

As shown in FIG. 6, throat mechanism 46 includes a nip flap 90 of flexible material extending downstream by a predetermined distance from the downstream edge 57 of plate 54. A portion of nip flap 90 is positioned opposite wires 50. Nip flap 90 utilizes the slurry velocity to create a low pressure area between nip flap 90 and the contact surface of the slurry as it is discharged by opening 48. The low pressure area on the inside of nip flap 90 permits atmospheric pressure to push nip flap 90 towards wires 50 and insures that the slurry contacts wires 50 immediately adjacent opening 48. Nip flap 90 insures that the full surface of sieve surface area 52 is utilized to make the particle size separation from the slurry. Nip flap 90 may be made of flexible material, for example, 6.35 mm (¼ in.) rubber.

Referring to FIG. 7, sieve surface area 52 has a portion 92 positioned behind throat mechanism 46 and headbox 40. Pivot 94 and arm 95 are attached by means of angle iron 106 to frame 96 which holds and supports sieve surface area 52. Frame 96, has end piece 107 which may be made of sheet metal and positioned at either end of sieve surface area 52. Frame 96, arm 95, angle iron 106 and pivot 94 provides a means for moving and positioning sieve surface area 52 and parts of the portion behind throat mechanism 46 and headbox 40 downstream of the throat mechanism 46 and headbox 40 to permit the slurry exiting throat mechanism 46 to flow over the additional sieve surface area 52.

Also shown in FIG. 7 is rapping diffusion bar 93 in contact with sieve surface area 52 at areas 103 and 108 for rapping sieve surface area 52 periodically to unplug the openings between the wires of the sieve of particles. Pneumatic cylinder 104 is attached to frame 96 and has a piston 105 driven by air for mechanically moving rapping diffusion bar 93. Sieves or screens suitable for use in FIGS. 7 and 8 may be obtained from Johnson Screen Company, St. Paul, Minnesota.

FIG. 8 shows the embodiment of FIG. 7, with the sieve surface area 52 exposed to slurry enlarged from an angle of 75 degrees to 110 degrees with respect to pivot 94. Hydraulic cylinder 97 shown in FIG. 7, is coupled from a stationary support to arm 95 and functions to move arm 95 and frame 96 in response to hydraulic commands to the cylinder 97. FIG. 8 shows hydraulic cylinder 97 fully extended. Hopper 98 collects the underflow that passes through sieve surface area 52 and feeds it out duct 99. Spout 100 receives the slurry that flows over sieve surface area 52 which has one end over the opening of duct 101. Spout 100 has its lower surface resting on the edge 102 of duct 101. Spout 100 may move freely over edge 102 as frame 96 is moved behind or out from throat mechanism 46 and headbox 40. The other end of spout 100 is linked to frame 96 for collecting the slurry passing over sieve surface area 52. Nip flap 90 permits the sieve surface area 52 to be positioned slightly behind headbox 40 and throat mechanism 46 instead of tangent to the exit of throat mechanism 46 because the slurry is pressed against sieve surface area 52 at opening 48 by nip flap 90.

A measuring instrument 110 shown in FIGS. 7 and 8 may measure a parameter, for example, the fine particles in the slurry downstream of hopper 101 and generate a control signal on lead 111 to cylinder 97 to adjust sieve surface area 52 exposed to slurry.

The embodiment shown in FIGS. 7 and 8 permits the sieve surface area to be moved while in operation with slurry flowing over sieve surface area 52. The presence of nip flap 90 and the movement of sieve surface area 52 make it possible for sieve performance to be maintained for a longer period of time before requiring the sieve to be turned end for end and optimize by permitting automated adjustment of the sieve surface area 52 exposed to the slurry in response to operating parameters of downstream equipment. The improved performance of the combination of headbox 40, throat mechanism 46, nip flap 90 and sieve surface area 52 permit improved performance i.e. increased throughput capacities (higher allowable feed rates of slurry) as compared to prior commercial sieve bends.

An improved sizing device has been described comprising a headbox 40, a throat mechanism 46, a nip flap 90 and a sieve surface area 52 supported by a frame 96 which is movable about pivot 94 for adjusting the screen to and from behind headbox 40 to expose additional sieve surface area 52. Nip flap 90 insures that the slurry leaving throat mechanism 46 comes into immediate contact with wires 50 of sieve surface area 52. Throat mechanism 46 includes a plate 54 which may pivot about pivot 56 with a spring 70 coupled through arms 71 and 73. Throat mechanism 46 may clear itself of the debris by responding to the additional static head pressure in the range from 91.44 cm. (36 in.) to 104.14 cm. (41 in.). Plate 54 pushes against spring 70 in response to static head pressure of the slurry in headbox 40.

What is claimed is:

1. An apparatus for separating fine particles from a slurry comprising: a headbox having a first opening for receiving into a region for holding said slurry and a second opening including a throat mechanism for discharging said slurry from said region to flow over a plurality of spaced apart wires positioned transverse to said second opening, said wires positioned successively downstream to form a sieve surface area for said slurry to flow over, said sieve surface area having a portion positioned behind said throat mechanism and headbox and means for moving and positioning said sieve surface area and parts of said portion behind said throat mechanism downstream of said throat mechanism to permit said slurry to flow over additional sieve surface area, wherein said throat mechanism includes first means for varying the width of said second opening as a function of a predetermined variable, wherein said first means includes a plate on one side of said throat mechanism having one edge pivotably attached upstream to permit said plate to swing about said pivot to provide an adjustable opening at a downstream edge of said plate and wherein said variable is the static head, wherein said first means further includes second means for adjusting the position of said plate about said pivot as a function of pressure on said plate from said slurry, and, wherein said second means includes springs with calibrated tension.

2. An apparatus for separating fine particles from a slurry comprising: a headbox having a first opening for receiving into a region for holding said slurry and a second opening including a throat mechanism for discharging said slurry from said region to flow over a plurality of spaced apart wires positioned transverse to said second opening, said wires positioned successively downstream to form a sieve surface area for said slurry to flow over, said sieve surface area having a portion positioned behind said throat mechanism and headbox and means for moving and positioning said sieve surface area and parts of said portion behind said throat mechanism downstream of said throat mechanism to permit said slurry to flow over additional sieve surface area, wherein said throat mechanism includes first means for varying the width of said second opening as a function of a predetermined variable, and wherein said throat mechanism includes a nip flap of flexible material extending downstream by a predetermined distance from said downstream edge of said plate with a portion of said nip flap positioned opposite said wires.

* * * * *